(12) United States Patent
Herold

(10) Patent No.: US 6,888,573 B2
(45) Date of Patent: May 3, 2005

(54) DIGITAL PIXEL SENSOR WITH ANTI-BLOOMING CONTROL

(75) Inventor: Barry W. Herold, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 100 days.

(21) Appl. No.: 10/285,250

(22) Filed: Oct. 31, 2002

(65) Prior Publication Data

US 2004/0085466 A1 May 6, 2004

(51) Int. Cl.[7] .............................. H04N 3/14; H04N 9/64; H01L 27/148; H01L 29/768
(52) U.S. Cl. ...................... 348/314; 348/308; 348/248; 257/223; 257/230; 257/445
(58) Field of Search ................... 348/248, 296, 348/297, 298, 299, 307, 308, 314, 215.1; 250/208.1; 257/223, 230, 445, E27.139, E27.145, E27.162; 438/79

(56) References Cited

U.S. PATENT DOCUMENTS

| | | | | |
|---|---|---|---|---|
| 4,302,779 A | * | 11/1981 | Inoue ................... 257/E27.162 |
| 5,898,168 A | * | 4/1999 | Gowda et al. .............. 348/311 |
| 5,900,623 A | * | 5/1999 | Tsang et al. ............. 250/208.1 |
| 5,969,758 A | * | 10/1999 | Sauer et al. ................ 348/308 |
| 5,978,024 A | * | 11/1999 | Lee ............................. 348/314 |
| 6,002,123 A | * | 12/1999 | Suzuki .................... 250/208.1 |
| 6,069,377 A | * | 5/2000 | Prentice et al. ....... 257/E27.132 |
| 6,307,195 B1 | * | 10/2001 | Guidash ..................... 348/308 |
| 6,410,901 B1 | * | 6/2002 | Lee et al. ................ 250/208.1 |
| 6,424,375 B1 | * | 7/2002 | Fowler ........................ 348/241 |
| 6,452,633 B1 | * | 9/2002 | Merrill et al. .............. 348/302 |
| 6,590,610 B2 | * | 7/2003 | Castro et al. ................ 348/297 |
| 6,593,961 B1 | * | 7/2003 | Perino ........................ 348/247 |
| 6,633,028 B2 | * | 10/2003 | Fowler .................... 250/208.1 |
| 6,635,857 B1 | * | 10/2003 | Kindt ......................... 348/296 |
| 6,778,214 B1 | * | 8/2004 | Toma ........................ 348/314 |
| 2003/0058356 A1 | * | 3/2003 | DiCarlo et al. ............. 348/241 |

FOREIGN PATENT DOCUMENTS

| | | | | | |
|---|---|---|---|---|---|
| DD | 261473 A | * | 10/1988 | ............ H04N/5/21 |
| JP | 63232684 A | * | 9/1988 | .......... H04N/5/335 |
| JP | 04262678 A | * | 9/1992 | .......... H04N/5/335 |
| JP | 07298141 A | * | 11/1995 | ......... H01L/27/148 |

* cited by examiner

Primary Examiner—Wendy R. Garber
Assistant Examiner—John M. Villecco

(57) ABSTRACT

An anti-blooming charge accumulation pixel using an anti-blooming element coupled to the pixel prevents blooming by ensuring that a voltage of a charge accumulation device of the pixel is always returned to a clamping voltage following comparison events. The anti-blooming element is used to return the voltage across a photodiode to the supply voltage when both a low voltage comparison and a high voltage comparison have occurred. A control block is used to determine an input signal to the anti-blooming element based upon the result of a low voltage comparison and a high voltage comparison. The input signal can be used to drive the anti-blooming element to a desired logic level, thereby causing the voltage across the charge accumulation device to be the clamping voltage. The use of the anti-blooming element eliminates blooming to adjacent pixels, independent of an integration time of the pixel.

24 Claims, 4 Drawing Sheets

-PRIOR ART-

DIGITAL PIXEL SENSOR WITH ANTI-BLOOMING CONTROL

TECHNICAL FIELD

This invention relates generally to the field of optical devices and systems, and more specifically to digital pixel sensors.

BACKGROUND OF THE INVENTION

Complementary metal-oxide semiconductor active pixel sensors (CMOS APS) were originally developed by the Jet Propulsion Laboratory (JPL) for sensor applications that require reduced mass, power, and size in comparison to traditional charge coupled device (CCD) sensors. CMOS APS may be fabricated such that the sensor and the read electronics are present on a single silicon chip. The current CMOS sensor technology utilizes a photo diode with reset, transfer, source follower, and address transistors to implement each pixel. Pixels are often arranged as an array. The pixel array is reset, and then exposed to incoming light for a predetermined integration time. At the end of the integration time, the pixel array is transferred and read through an analog signal processing chain, and the serial digital data is then processed through several digital algorithms to create the final image.

Referring now to FIG. 1, an exemplary CMOS active pixel sensor (APS) pixel 100 is shown. The CMOS APS pixel 100 is reset by turning reset transistor 130 on and transfer transistor 120 on. This causes the voltage across photo diode 110 to be $V_t$ less than supply voltage $V_{dd}$ 135. Then, reset transistor 130 and transfer transistor 120 are turned off, so that photo diode 110 remains approximately $V_t$ less than supply voltage $V_{dd}$ 135. Because of charge sharing between transfer transistor 120 and photo diode 110, the final diode voltage after reset will be slightly less than the reset voltage.

In order to read the CMOS APS pixel 100, reset transistor 130 and read transistor 150 are turned on. The reset voltage level is then read using bitline 160. The read transistor 150 and reset transistor 130 are turned off. Transfer gate 140 is then turned on and then off, which transfers any pixel charge stored in photo diode 110 onto floating diffusion 125. Finally, read transistor 150 is turned on, and the pixel level is read. A column decoder uses bitline 160 to present the difference between the reset level and the pixel level to the analog signal processing chain (ASPC).

During the read operation, mismatch on a pixel to pixel level of the reset transistor 130, read transistor 150 and transfer transistor 120 can cause fixed pattern noise in the final image. Also, variations in the column current reference applied to each bit line can cause a column pattern noise in the final image. For this reason, usually, a correlated double sampling (CDS) of the pixels is performed. This CDS is accomplished by reading the reset voltage, reading the pixel voltage, and providing the difference voltage to the analog processing chain, as described above. The CDS approach can significantly reduce the fixed pattern noise in the image.

Another source of noise in the pixel is the charge transfer noise. At the end of the integration time, the charge in photo diode 110 is transferred to the floating diffusion 125 between the reset transistor 130 and the transfer transistor 120.

The goal is to transfer all of the charge from the photo diode 110 to the floating diffusion 125. Since the transfer is dependent on the photo diode voltage at the end of integration, the physical design of the photo diode 110, transfer gate 120, and floating diffusion 125 are very important.

In an APS system, the photo diode is allowed to accumulate charge during the integration time, and at the end of the integration time, the photo diode voltage is read. This voltage is then transformed into a digital signal that represents the incident power of light at the pixel. The relationship between power, time and voltage is given by $$P_I = \frac{V_{PD} \cdot C_{PD} \cdot h \cdot c}{q \cdot Q_E \cdot T_I \cdot \lambda}$$

where $P_I$ is the incident light power,
$V_{PD}$ is the photo diode voltage,
$C_{PD}$ is the photo diode capacitance,
$Q_E$ is the quantum efficiency,
$T_I$ is the integration time,
h is Planck's constant,
c is the speed of light,
q is the electron charge, and
$\lambda$ is the wavelength.

At the end of the integration time, the power levels can be grouped into two categories, the saturated powers, and the unsaturated powers. Referring now to FIG. 2, a plot 200 of APS photo diode voltage versus integration time is shown. Saturated powers P1 and P2 210 are mapped into the maximum level of the analog-to-digital conversion (ADC), while unsaturated powers P3 and P4 220 can be mapped into distinct levels. Also, the saturated powers can cause blooming in the pixel array. Once a pixel has reached its saturation level, the charge generated in the photo diode of this pixel escapes to other pixels in close proximity. This causes the other pixels to accumulate charge not associated with their incident light, and consequently the other pixels are read out as a higher intensity level.

Referring now to FIG. 3, a side view of a photo diode under high intensity illumination 300 is shown. Photo diode 310 is receiving high intensity illumination 340, while a neighboring photodiode 320 is receiving low intensity illumination 350. High intensity illumination 340 causes photo diode 310 to drop below ground, which then turns on parasitic transistor 330. Blooming occurs when high intensity light causes a photo diode to drop below ground, which turns on the parasitic transistor 330. When parasitic transistor 330 is on, its collector induces current that artificially drops the photo diode 320. This causes the pixel associated with photo diode 320 to detect a higher illumination than the low intensity illumination 350. The current of parasitic transistor 330 causes a blooming effect, in which the image intensity is overestimated in regions surrounding a high intensity illumination.

There are many processing variations that have been used to try to capture the excess charge before it reaches an adjacent pixel, such as deep implants, trenches, etc. However, for the active pixel sensor, only unsaturated powers can be detected. There is therefore an unmet need in the art for an active pixel sensor that is able to isolate the effects of blooming, and to enable power levels occurring under saturation conditions to be detected.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
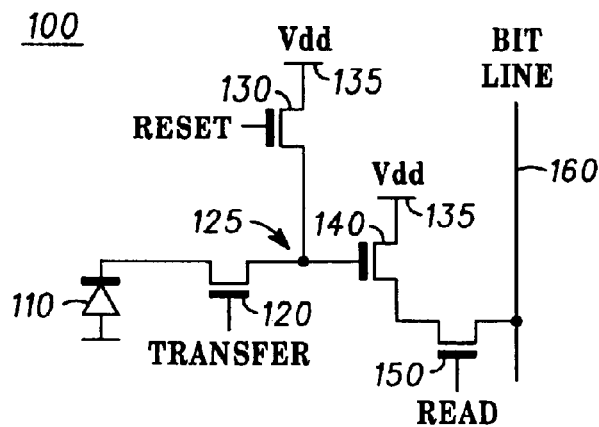
FIG. 1 is a schematic of a CMOS APS Pixel, according to the prior art.
Figure 2:
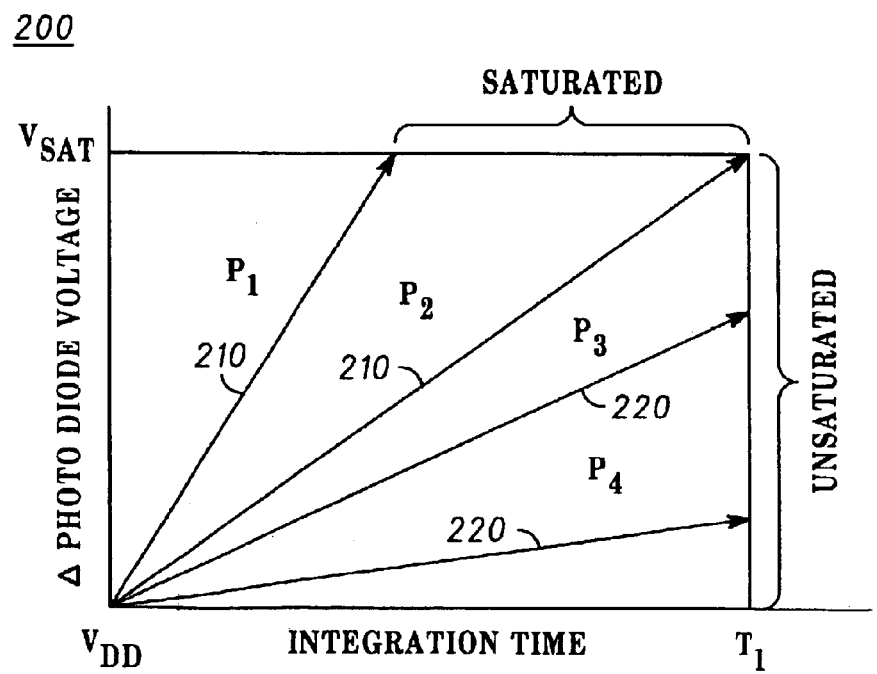
FIG. 2 is a plot of APS photo diode voltage versus integration time.
Figure 3:
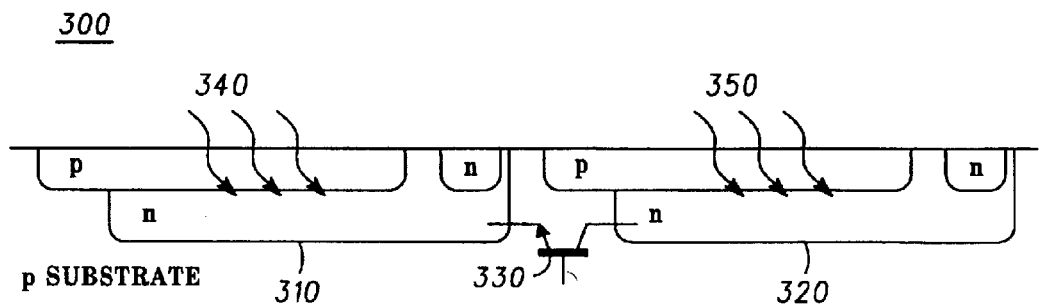
FIG. 3 is a side view of a photo diode under high intensity illumination.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 4:
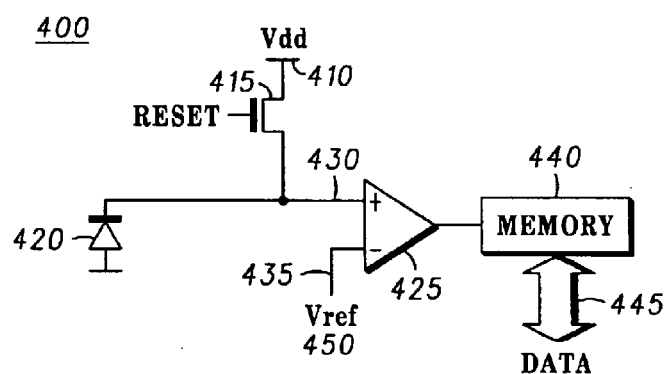
FIG. 4 is a schematic of a CMOS Charge Accumulation Pixel.

Referring now to FIG. 4, an exemplary schematic of a charge Accumulation Pixel 400 of a plurality of charge accumulation pixels is shown. In this schematic, photodiode 420 is connected directly to a positive input 430 of comparator 425. This connection allows a voltage of photodiode 420 to be directly measured before and after an integration time. A negative input 435 of comparator 425 is coupled to a reference voltage Vref 450. Photodiode 420 is coupled to reset transistor 415, which is further coupled to a voltage Vdd 410. Photodiode 420 is reset by turning reset transistor 415 on and then off. If reset transistor 415 is NMOS, then a reset voltage is within a Vt below voltage Vdd 410. If reset transistor 415 is PMOS, the reset voltage is the voltage Vdd 410. Thus, the use of a PMOS reset transistor eliminates the mismatch of reset transistors between a number of charge accumulation pixels.

During an integration phase, a voltage of photodiode 420 is compared to reference voltage Vref 450. As photodiode 420 reaches reference voltage Vref 450, memory element 440 captures data 445. Because each pixel of the plurality of charge accumulation pixels is able to capture data values independently, effective analog to digital conversion (ADC) occurs at a low speed, thereby saving power and enabling faster read access.

Figure 5:
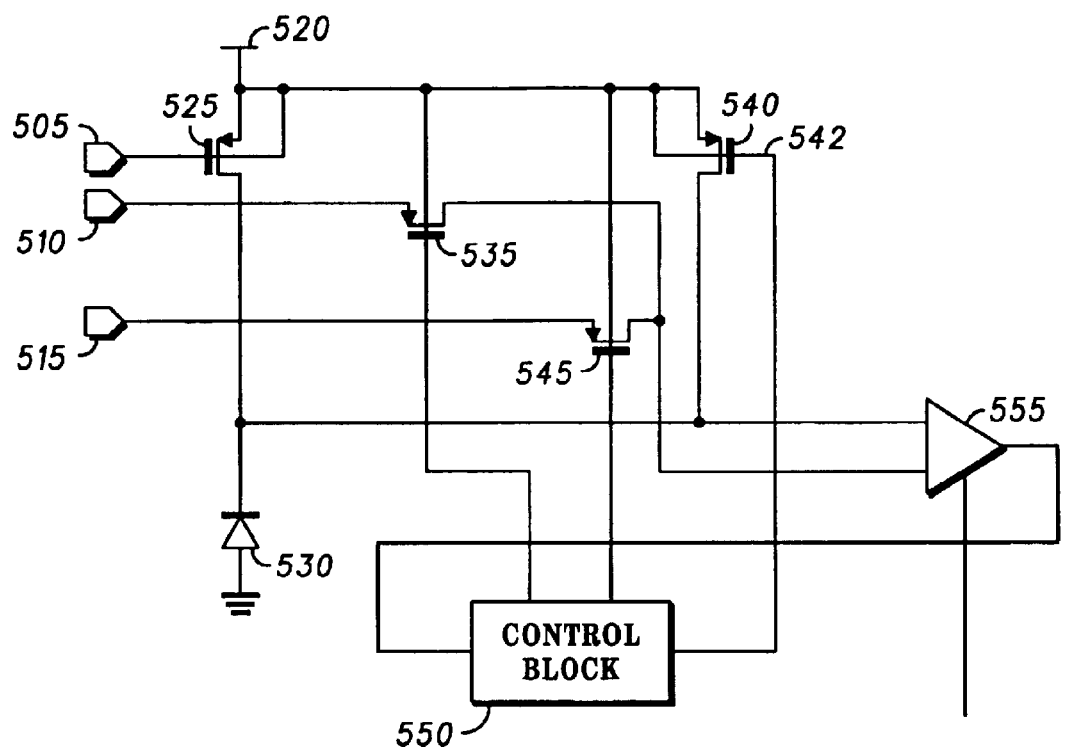
FIG. 5 is a schematic of an anti-blooming Charge Accumulation Pixel, according to certain embodiments of the present invention.

Referring now to FIG. 5, a schematic of an anti-blooming Charge Accumulation Pixel 500 is shown, in accordance with a preferred embodiment of the present invention. Anti-blooming transistor 540 is coupled to a positive input of comparator 555 using a first input, coupled to an control signal 542 using a second input, and coupled to low reference transistor 545, high reference transistor 535, reset transistor 525 using a third input. The third input of anti-blooming transistor 540 is also coupled to the second input.

Reset transistor 535 is further coupled to photodiode 530, reset control signal 505, high reference transistor 535, and low reference transistor 545. An input voltage level can be compared to a low voltage reference level 515 using low reference transistor 545, while a high voltage level can be compared to a high voltage reference level 510 using high reference transistor 535. The output of the voltage comparison using low reference transistor 545 and the output of the voltage comparison using high reference transistor 535 are coupled to control block 550. Control block 550 processes these two outputs to determine control signal 542. When both a low voltage comparison using low reference transistor 545 and a high voltage comparison using high reference transistor 535 have occurred, control block 550 causes control signal 542 to go low.

When control signal 542 is low, a voltage level of photodiode 530, which is coupled to the first input of anti-blooming transistor 540, is returned to a clamping voltage, such as supply voltage Vdd 520; the clamping voltage can be any voltage that serves a clamping function, such as a supply voltage or a predetermined voltage level. Supply voltage Vdd 520 is coupled to reset transistor 525, which is coupled to anti-blooming transistor 540 as mentioned previously. The ability of the circuit shown in FIG. 5 to couple the voltage level of photodiode 530 to supply voltage 520 allows the blooming to adjacent pixels to be eliminated, independent of integration time. The ability of the circuit of FIG. 5 to perform a comparison of the input voltage level with low voltage reference 515 and high voltage reference 510 further allows said circuit to determine a voltage level prior to saturation.

It is noted that one of skill in the art will recognize that a single high reference voltage may be used to accomplish the anti-blooming action, without departing from the spirit and scope of the present invention. The single reference voltage may be used to determine when the voltage level of photodiode 530 exceeds a saturation level. It is further noted that one of skill in the art will recognize that the functionality of the comparator 555 and control block 550 may be combined without departing from the spirit and scope of the present invention.

It is further noted that in addition to the preferred embodiment shown in FIG. 5, the anti-blooming charge accumulation pixel may be implemented in a more streamlined manner. Anti-blooming transistor 540 may function as a reset device, thereby obviating the need for reset transistor 525, reset control signal 505 and high-reference transistor 535, for example. Much of the functionality provided by these elements would be implemented by control block 550. In this case, control signal 542, generated by control logic of control block 550, would go low to reset the pixel and would also go to a low logic level when comparison by comparator 555 has occurred.

Figure 6:
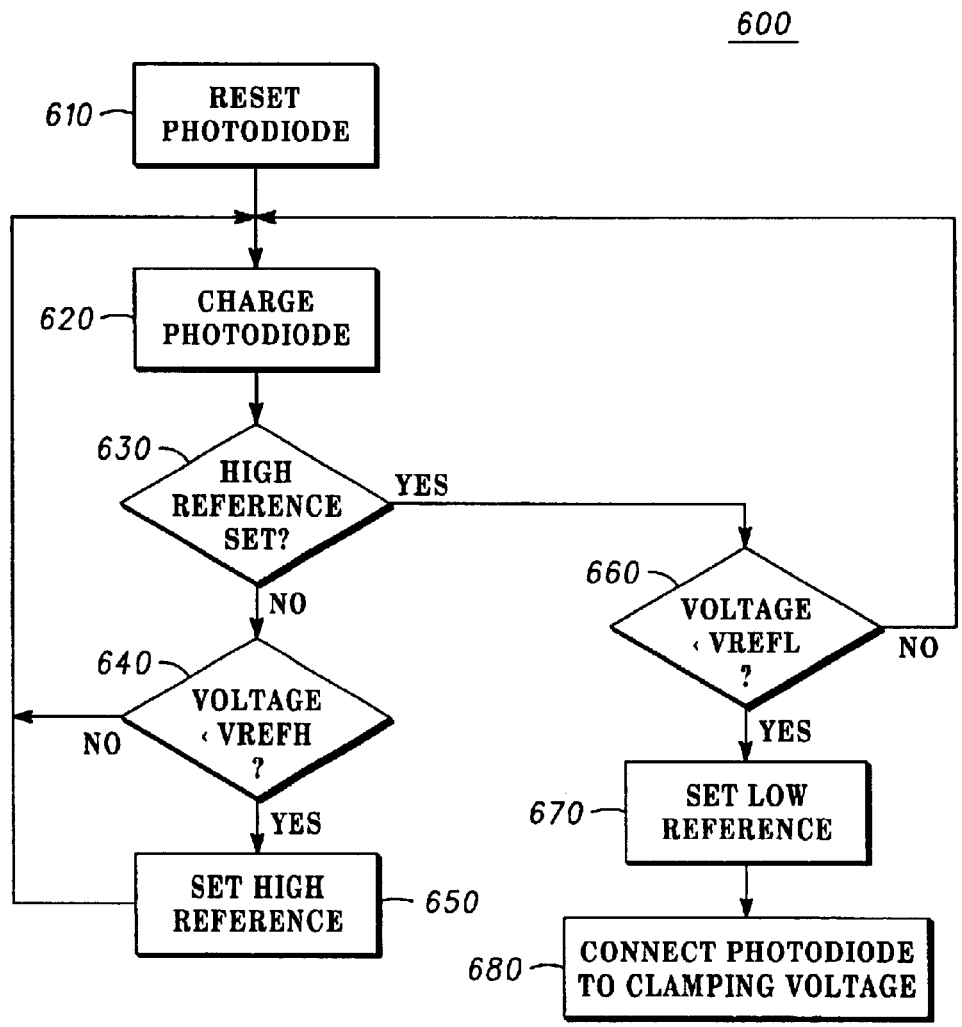
FIG. 6 is a flow diagram of an anti-blooming Charge Accumulation Pixel, according to certain embodiments of the present invention.

Referring now to FIG. 6, a flow diagram 600 of a methodology in accordance with certain embodiments of the present invention is shown. After resetting photodiode 530 at Block 610, photodiode 530 starts charging when optical power is incident at Block 620. The inquiry at Decision Block 630 is whether the high voltage reference has been set? If it has not, then the flow continues to Decision Block 640 to determine whether the voltage of photodiode 530 is less than the high reference voltage VREFH. If no, then the flow returns to charging of photodiode 530 at Block 620. If yes, then the high reference voltage is set at Block 650 before returning to Block 620.

If the High reference voltage has been set, then the inquiry at Decision Block 660 is whether the photodiode voltage is less than the low reference voltage VREFL. If no, then the flow returns to Block 620. If yes, then the low reference voltage is set at Block 670. The voltage of photodiode 530 is known vis-à-vis the high and low reference voltages and at Block 680, the photodiode 530 is connected to clamping voltage, such as Vdd.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An anti-blooming charge accumulation pixel, comprising:
   a charge accumulation device coupled to a clamping voltage providing an output voltage;
   an anti-blooming element, coupled to the clamping voltage and coupled to the charge accumulation device, wherein said anti-blooming element is operable to couple the charge accumulation device to the clamping voltage upon receiving a control signal; and
   a comparison element, coupled to the charge accumulation device and the anti-blooming element and receiving a reference voltage, said comparison element operable to generate the control signal when the output voltage of the charge accumulation device exceeds the reference voltage.

2. The structure of claim 1, wherein the pixel is reset upon the control signal being taken to a first voltage level by the comparison element.

3. The structure of claim 1, the comparison element further comprising:
   a control block coupled to the anti-blooming element and the clamping voltage, wherein said control block is operable to generate the control signal; and
   a comparator, coupled to the control block, the charge accumulation device, and the anti-blooming element, wherein the comparator is operable to generate a comparison signal from the output voltage of the charge accumulation device and the reference voltage.

4. The structure of claim 3, wherein the pixel is reset upon the control block causing the control signal to go to a first voltage level.

5. The structure of claim 3, wherein the control block causes the control signal to go to a first voltage level upon generation of the comparison signal by the comparator.

6. The structure of claim 1, further comprising:
   a reset element coupled to the clamping voltage, the anti-blooming element and the comparison element, wherein upon receipt of a reset signal the reset element causes the pixel to reset.

7. The structure of claim 6, wherein the reset element further comprises:
   a reset transistor operative to receive the reset signal and coupled to the clamping voltage.

8. The structure of claim 1, wherein the clamping voltage is one of a supply voltage and a predetermined voltage.

9. The structure of claim 1, wherein the anti-blooming device is a transistive element.

10. The structure of claim 1, wherein the reference voltage is selectively coupled to a plurality of reference voltages.

11. An anti-blooming charge accumulation pixel, comprising:
    a reset element coupled to a clamping voltage and operative to reset the pixel upon receipt of a reset signal;
    a charge accumulation device coupled to the reset element providing an output voltage;
    an anti-blooming element, coupled to the clamping voltage and the charge accumulation device, wherein said anti-blooming element is operable to couple the charge accumulation device to the clamping voltage upon receiving a control signal; and
    a comparison element, coupled to the charge accumulation device and the anti-blooming element and receiving a reference voltage, said comparison element operable to generate the control signal when the output voltage of the charge accumulation device exceeds the reference voltage, said comparison element further comprising:
       a control block coupled to the anti-blooming element and the clamping voltage, wherein said control block is operable to generate the control signal; and
       a comparator, coupled to the control block, the charge accumulation device, the reset element, and the anti-blooming element, wherein the comparator is operable to generate a comparison signal from the output voltage of the charge accumulation device and the reference voltage.

12. The structure of claim 11, wherein the control block causes the control signal to go to a first voltage level upon generation of the comparison signal by the comparator.

13. The structure of claim 11, wherein the reset element further comprises:
    a reset transistor operative to receive the reset signal and coupled to the clamping voltage.

14. The structure of claim 11, wherein the anti-blooming device is a transistive element.

15. The structure of claim 11, wherein the reference voltage is selectively coupled to a plurality of reference voltages as controlled by the control block.

16. An anti-blooming charge accumulation pixel, comprising:
    a charge accumulation device coupled to a clamping voltage providing an output voltage;
    an anti-blooming element, coupled to the clamping voltage, wherein said anti-blooming element is operable to couple the charge accumulation device to the clamping voltage upon receiving a control signal;
    a first transistive element, coupled to the charge accumulation device and to the clamping voltage and operable to receive a reset signal;
    a second transistive element operable to receive a first reference voltage and controllable by a first reference control signal;
    a third transistive element operable to receive a second reference voltage and controllable by a second reference control signal;
    a control block operable to generate the first and second reference control signals, a comparator control signal, and the control signal when the output voltage of the charge accumulation device exceeds the first reference voltage and the output voltage of the charge accumulation device exceeds the second reference voltage; and
    a comparator operable to receive a reference voltage and the output voltage of charge accumulation device and to generate a comparison signal in accordance with the comparator control signal.

17. The structure of claim 16, wherein the control block generates the control signal when the output voltage is greater than the second reference voltage and the first reference voltage.

18. A method for the elimination of blooming in a charge accumulation pixel, said method comprising:

charging a photodiode;

providing a first transistive element operable to receive a first voltage reference level to be used in the comparison of a voltage level of the photodiode with a first reference indicator, wherein when a voltage level of photodiode exceeds the first voltage reference level, setting the first reference indicator;

providing a second transistive element operable to receive a second voltage reference level to be used in the comparison of a voltage level of the photodiode with a second reference indicator, wherein when the voltage level of photodiode exceeds the second voltage reference level, setting the second reference indicator; and connecting the photodiode to a clamping voltage thereby eliminating a blooming in a charge accumulation pixel.

19. A method in accordance with claim 18, wherein a comparator is used to compare the voltage level to the first voltage reference level and to compare the voltage level to the second voltage reference level.

20. A method in accordance with claim 18, wherein the second voltage reference level is operable to be selected so that one or more voltage levels in a region may be detected.

21. A method in accordance with claim 18, wherein connecting the photodiode to the clamping voltage is performed by a control signal generated by a control block.

22. A method in accordance with claim 21, wherein the photodiode is connected to the clamping voltage when the control signal is an active logic level.

23. A method in accordance with claim 18, wherein prior to charging the photodiode, resetting the photodiode.

24. A method in accordance with claim 23, wherein the photodiode is reset using a transistive element coupled to the photodiode and coupled to the clamping voltage.

* * * * *